United States Patent
Keserich et al.

(10) Patent No.: US 12,282,846 B2
(45) Date of Patent: Apr. 22, 2025

(54) METHOD, APPARATUS, AND COMPUTER PROGRAM PRODUCT FOR SURVEILLANCE OF ROAD ENVIRONMENTS VIA DEEP LEARNING

(71) Applicant: HERE GLOBAL B.V., Eindhoven (NL)

(72) Inventors: Brad Keserich, Eindhoven (NL); Joshua Michael Finken, Park City, UT (US)

(73) Assignee: HERE GLOBAL B.V., Eindhoven (NL)

( * ) Notice: Subject to any disclaimer, the term of this patent is extended or adjusted under 35 U.S.C. 154(b) by 1112 days.

(21) Appl. No.: 17/133,086

(22) Filed: Dec. 23, 2020

(65) Prior Publication Data

US 2022/0198262 A1 Jun. 23, 2022

(51) Int. Cl.
*G06N 3/08* (2023.01)
*G01C 21/00* (2006.01)
*G06F 16/29* (2019.01)
*G06N 3/04* (2023.01)
*G06Q 20/38* (2012.01)
*G08G 1/01* (2006.01)

(52) U.S. Cl.
CPC .......... *G06N 3/08* (2013.01); *G01C 21/3815* (2020.08); *G01C 21/3844* (2020.08); *G06F 16/29* (2019.01); *G06N 3/04* (2013.01); *G06Q 20/3821* (2013.01); *G08G 1/0129* (2013.01); *G06Q 2220/00* (2013.01)

(58) Field of Classification Search
CPC .................................. G06N 3/08; G06N 3/04
See application file for complete search history.

(56) References Cited

U.S. PATENT DOCUMENTS 9,623,876 B1 4/2017 Slusar
9,984,566 B1 * 5/2018 Mostofi ............... G08G 1/0175
(Continued)

FOREIGN PATENT DOCUMENTS

WO WO 2019/115371 A1 6/2019

OTHER PUBLICATIONS

GitHub—chorusmobility/driver-behavior-android-ethereum-app: Chorus mobility—Good Driving Behavior Android Demo [online] [Retrieved Mar. 24, 2021] Retrieved from the Internet: <URL: https://github.com/chorusmobility/driver-behavior-android-ethereum-app> (Sep. 25, 2018), 2 pages.

*Primary Examiner* — Daniel T Pellett
(74) *Attorney, Agent, or Firm* — Alston & Bird LLP

(57) ABSTRACT

A method, apparatus and computer program product are provided for surveillance of road environments via deep learning. In this regard, one or more features for vehicle sensor data associated with one or more vehicles traveling along a road segment proximate to a vehicle are determined. The vehicle includes one or more sensors that captures the vehicle sensor data. Furthermore, vehicle behavior data associated with the one or more vehicles is predicted using a machine learning model that receives the one or more features. The machine learning model is trained for detection of vehicle behavior based on historical vehicle sensor data and one or more rules associated with the road segment. The vehicle behavior data is also encoded in a database to facilitate modeling of vehicle behavior associated with the road segment.

19 Claims, 8 Drawing Sheets

(56) References Cited

U.S. PATENT DOCUMENTS

| | | |
|---|---|---|
| 10,296,794 B2 | 5/2019 | Ratti |
| 2015/0081404 A1 | 3/2015 | Basir |
| 2017/0200061 A1 | 7/2017 | Julian et al. |
| 2018/0129220 A1* | 5/2018 | Beach ................. G01C 21/3407 |
| 2019/0025818 A1 | 1/2019 | Mattingly et al. |
| 2019/0329791 A1 | 10/2019 | Oba |
| 2020/0090203 A1* | 3/2020 | Reichenbach ...... B60R 16/0234 |
| 2020/0293041 A1* | 9/2020 | Palanisamy .............. G06N 3/08 |
| 2021/0094547 A1* | 4/2021 | Garcia ................ B60W 30/181 |

* cited by examiner

METHOD, APPARATUS, AND COMPUTER PROGRAM PRODUCT FOR SURVEILLANCE OF ROAD ENVIRONMENTS VIA DEEP LEARNING

TECHNOLOGICAL FIELD

An example embodiment of the present disclosure generally relates to surveillance of road environments associated with vehicles via deep learning and, more particularly, to a method, apparatus and computer program product for surveillance of road environments associated with vehicles via deep learning.

BACKGROUND

The advancement of computing technology has led to various types of sensors being used in various types of devices including, for example, user devices, vehicles, traffic monitoring systems, surveillance systems, drones, etc. Furthermore, these devices routinely exchange data collected from these various types of sensors. However, monitoring and/or collecting data from these various types of sensors is often costly for a technological application.

BRIEF SUMMARY

A method, apparatus and computer program product are provided for surveillance of road environments via deep learning. For instance, in one or more embodiments, method, apparatus and computer program product are provided in order to determine vehicle behavior for vehicles associated with a road environment using deep learning. As such, precision and/or confidence of surveillance capabilities of road environments associated with vehicles can be improved. Furthermore, improved safety and/or performance of a vehicle can be provided.

In an example embodiment, a computer-implemented method is provided for surveillance of road environments via deep learning. The computer-implemented method includes determining one or more features for vehicle sensor data associated with one or more vehicles traveling along a road segment proximate to a vehicle, where the vehicle comprises one or more sensors that captures the vehicle sensor data. The computer-implemented method also includes predicting, using a machine learning model that receives the one or more features, vehicle behavior data associated with the one or more vehicles, where the machine learning model is trained for detection of vehicle behavior based on historical vehicle sensor data and one or more rules associated with the road segment. Furthermore, the computer-implemented method includes encoding the vehicle behavior data in a database to facilitate modeling of vehicle behavior associated with the road segment.

In an example embodiment, the computer-implemented method also includes receiving the vehicle sensor data from the vehicle. In this example embodiment, the computer-implemented method also includes, in response to the receiving the vehicle sensor data from the vehicle, generating incentive data for a user identity associated with the vehicle. In another example embodiment, the generating the incentive data for the user identity comprises providing one or more cryptocurrency tokens to an account associated with the user identity.

In an example embodiment, the computer-implemented method also includes, based on the vehicle sensor data, generating incentive data for one or more user identities associated with the one or more vehicles. In another example embodiment, the encoding the vehicle behavior data in the database comprises mapping the vehicle behavior data onto a map data layer of a high-definition map to facilitate the modeling of the vehicle behavior associated with the road segment.

In another example embodiment, the mapping the vehicle behavior data onto the map data layer comprises mapping the vehicle behavior data onto the map data layer based on location data associated with the road segment. In another example embodiment, the mapping the vehicle behavior data onto the map data layer comprises mapping the vehicle behavior data onto the map data layer based on vehicle data associated with the one or more vehicles. In another example embodiment, the mapping the vehicle behavior data onto the map data layer comprises mapping the vehicle behavior data onto the map data layer based on time data associated with capture of the vehicle sensor data by the one or more sensors of the vehicle.

In an example embodiment, the computer-implemented method also includes facilitating autonomous driving of the vehicle based on the vehicle behavior data. In another example embodiment, the determining the one or more features for the vehicle sensor data comprises determining the one or more features for the vehicle sensor data in response to a determination that the vehicle is associated with a defined geofence region of the road segment.

In another example embodiment, an apparatus is configured to provide for surveillance of road environments via deep learning. The apparatus includes processing circuitry and at least one memory including computer program code instructions that are configured to, when executed by the processing circuitry, cause the apparatus to determine one or more features for vehicle sensor data associated with one or more vehicles traveling along a road segment proximate to a vehicle, where the vehicle comprises one or more sensors that captures the vehicle sensor data. The computer program code instructions are also configured to, when executed by the processing circuitry, cause the apparatus to predict, using a machine learning model that receives the one or more features, vehicle behavior data associated with the one or more vehicles, where the machine learning model is trained for detection of vehicle behavior based on historical vehicle sensor data and one or more rules associated with the road segment. The computer program code instructions are also configured to, when executed by the processing circuitry, cause the apparatus to encode the vehicle behavior data in a database to facilitate modeling of vehicle behavior associated with the road segment.

In another example embodiment, the computer program code instructions are also configured to, when executed by the processing circuitry, cause the apparatus to generate incentive data for a user identity associated with the vehicle in response to the vehicle sensor data being received from the vehicle. In another example embodiment, the computer program code instructions are also configured to, when executed by the processing circuitry, cause the apparatus to provide one or more cryptocurrency tokens to an account related to a user identity associated with the vehicle in response to the vehicle sensor data being received from the vehicle. In another example embodiment, the computer program code instructions are also configured to, when executed by the processing circuitry, cause the apparatus to map the vehicle behavior data onto a map data layer of a high-definition map to facilitate the modeling of the vehicle behavior associated with the road segment. In another example embodiment, the computer program code instructions are also configured to, when executed by the processing circuitry, cause the apparatus to map the vehicle behavior data onto the map data layer based on vehicle data associated with the one or more vehicles. In another example embodiment, the computer program code instructions are also configured to, when executed by the processing circuitry, cause the apparatus to map the vehicle behavior data onto the map data layer based on time data associated with capture of the vehicle sensor data by the one or more sensors of the vehicle. In another example embodiment, the computer program code instructions are also configured to, when executed by the processing circuitry, cause the apparatus to facilitate autonomous driving of the vehicle based on the vehicle behavior data.

In another example embodiment, a computer program product is provided for surveillance of road environments via deep learning. The computer program product includes at least one non-transitory computer readable storage medium having computer-executable program code instructions stored therein with the computer-executable program code instructions including program code instructions configured, upon execution, to determine one or more features for vehicle sensor data associated with one or more vehicles traveling along a road segment proximate to a vehicle, where the vehicle comprises one or more sensors that captures the vehicle sensor data. The computer-executable program code instructions are also configured to predict, using a machine learning model that receives the one or more features, vehicle behavior data associated with the one or more vehicles, where the machine learning model is trained for detection of vehicle behavior based on historical vehicle sensor data and one or more rules associated with the road segment. Furthermore, the computer-executable program code instructions are configured to encode the vehicle behavior data in a database to facilitate modeling of vehicle behavior associated with the road segment.

In another example embodiment, computer-executable program code instructions are also configured to generate incentive data for a user identity associated with the vehicle in response to the vehicle sensor data being received from the vehicle. In another example embodiment, computer-executable program code instructions are also configured to provide one or more cryptocurrency tokens to an account related to a user identity associated with the vehicle in response to the vehicle sensor data being received from the vehicle. In another example embodiment, computer-executable program code instructions are also configured to map the vehicle behavior data onto a map data layer of a high-definition map to facilitate the modeling of the vehicle behavior associated with the road segment. In another example embodiment, computer-executable program code instructions are also configured to map the vehicle behavior data onto the map data layer based on vehicle data associated with the one or more vehicles. In another example embodiment, computer-executable program code instructions are also configured to map the vehicle behavior data onto the map data layer based on time data associated with capture of the vehicle sensor data by the one or more sensors of the vehicle. In another example embodiment, computer-executable program code instructions are also configured to facilitate autonomous driving of the vehicle based on the vehicle behavior data.

In another example embodiment, an apparatus is provided that includes means for determining one or more features for vehicle sensor data associated with one or more vehicles traveling along a road segment proximate to a vehicle, where the vehicle comprises one or more sensors that captures the vehicle sensor data. The apparatus of this example embodiment also includes means for predicting, using a machine learning model that receives the one or more features, vehicle behavior data associated with the one or more vehicles, where the machine learning model is trained for detection of vehicle behavior based on historical vehicle sensor data and one or more rules associated with the road segment. The apparatus of this example embodiment also includes means for encoding the vehicle behavior data in a database to facilitate modeling of vehicle behavior associated with the road segment.

In an example embodiment, the apparatus also includes means for receiving the vehicle sensor data from the vehicle. In an example embodiment, the apparatus also includes means for, in response to the receiving the vehicle sensor data from the vehicle, generating incentive data for a user identity associated with the vehicle. In another example embodiment, the means for generating the incentive data for the user identity comprises means for providing one or more cryptocurrency tokens to an account associated with the user identity.

In an example embodiment, the apparatus also includes, based on the vehicle sensor data, means for generating incentive data for one or more user identities associated with the one or more vehicles. In another example embodiment, the means for encoding the vehicle behavior data in the database comprises means for mapping the vehicle behavior data onto a map data layer of a high-definition map to facilitate the modeling of the vehicle behavior associated with the road segment.

In another example embodiment, the means for mapping the vehicle behavior data onto the map data layer comprises means for mapping the vehicle behavior data onto the map data layer based on location data associated with the road segment. In another example embodiment, the means for mapping the vehicle behavior data onto the map data layer comprises means for mapping the vehicle behavior data onto the map data layer based on vehicle data associated with the one or more vehicles. In another example embodiment, the means for mapping the vehicle behavior data onto the map data layer comprises means for mapping the vehicle behavior data onto the map data layer based on time data associated with capture of the vehicle sensor data by the one or more sensors of the vehicle.

In an example embodiment, the apparatus also includes means for facilitating autonomous driving of the vehicle based on the vehicle behavior data. In another example embodiment, the means for determining the one or more features for the vehicle sensor data comprises means for determining the one or more features for the vehicle sensor data in response to a determination that the vehicle is associated with a defined geofence region of the road segment.

In an example embodiment, a computer-implemented method is provided for surveillance of road environments via deep learning. The computer-implemented method includes receiving, via one or more sensors of a vehicle, vehicle sensor data associated with one or more vehicles traveling along a road segment proximate to the vehicle. The computer-implemented method also includes identifying one or more features of the vehicle sensor data. Furthermore, the computer-implemented method includes training, based on the one or more features of the vehicle sensor data, a machine learning model associated with detection of vehicle behavior to facilitate mapping vehicle behavior data onto a map data layer.

In an example embodiment, the training comprises training the machine learning model to facilitate autonomous driving of vehicles associated with the road segment. In another example embodiment, the training comprises training the machine learning model to facilitate surveillance of the road segment by a law enforcement system.

In another example embodiment, an apparatus is configured to provide for surveillance of road environments via deep learning. The apparatus includes processing circuitry and at least one memory including computer program code instructions that are configured to, when executed by the processing circuitry, cause the apparatus to receive, via one or more sensors of a vehicle, vehicle sensor data associated with one or more vehicles traveling along a road segment proximate to the vehicle. The computer program code instructions are also configured to, when executed by the processing circuitry, cause the apparatus to identify one or more features of the vehicle sensor data. The computer program code instructions are also configured to, when executed by the processing circuitry, cause the apparatus to train, based on the one or more features of the vehicle sensor data, a machine learning model associated with detection of vehicle behavior to facilitate mapping vehicle behavior data onto a map data layer.

In an example embodiment, the computer program code instructions are also configured to, when executed by the processing circuitry, cause the apparatus to train the machine learning model to facilitate autonomous driving of vehicles associated with the road segment. In another example embodiment, the computer program code instructions are also configured to, when executed by the processing circuitry, cause the apparatus to train the machine learning model to facilitate surveillance of the road segment by a law enforcement system.

In another example embodiment, a computer program product is provided for surveillance of road environments via deep learning. The computer program product includes at least one non-transitory computer readable storage medium having computer-executable program code instructions stored therein with the computer-executable program code instructions including program code instructions configured, upon execution, to receive, via one or more sensors of a vehicle, vehicle sensor data associated with one or more vehicles traveling along a road segment proximate to the vehicle. The computer-executable program code instructions are also configured to identify one or more features of the vehicle sensor data. Furthermore, the computer-executable program code instructions are configured to train, based on the one or more features of the vehicle sensor data, a machine learning model associated with detection of vehicle behavior to facilitate mapping vehicle behavior data onto a map data layer.

In an example embodiment, the computer-executable program code instructions are also configured to train the machine learning model to facilitate autonomous driving of vehicles associated with the road segment. In another example embodiment, the computer-executable program code instructions are also configured to train the machine learning model to facilitate surveillance of the road segment by a law enforcement system.

In another example embodiment, an apparatus is provided that includes means for receiving, via one or more sensors of a vehicle, vehicle sensor data associated with one or more vehicles traveling along a road segment proximate to the vehicle. The apparatus of this example embodiment also includes means for identifying one or more features of the vehicle sensor data. The apparatus of this example embodiment also includes means for training, based on the one or more features of the vehicle sensor data, a machine learning model associated with detection of vehicle behavior to facilitate mapping vehicle behavior data onto a map data layer.

In an example embodiment, the means for training comprises means for training the machine learning model to facilitate autonomous driving of vehicles associated with the road segment. In another example embodiment, the means for training comprises means for training the machine learning model to facilitate surveillance of the road segment by a law enforcement system.

BRIEF DESCRIPTION OF THE DRAWINGS

Figure 1:
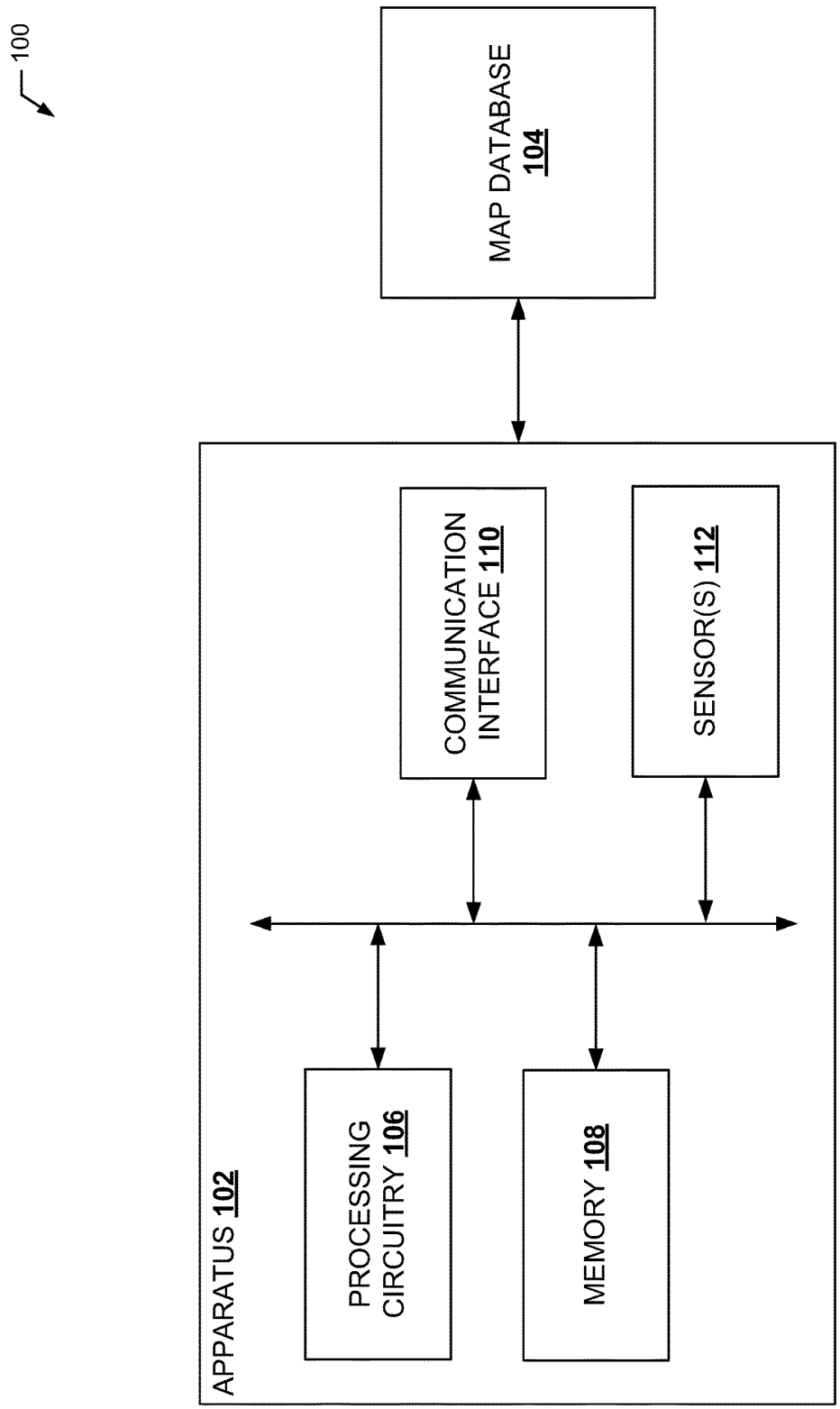
Figure 2:
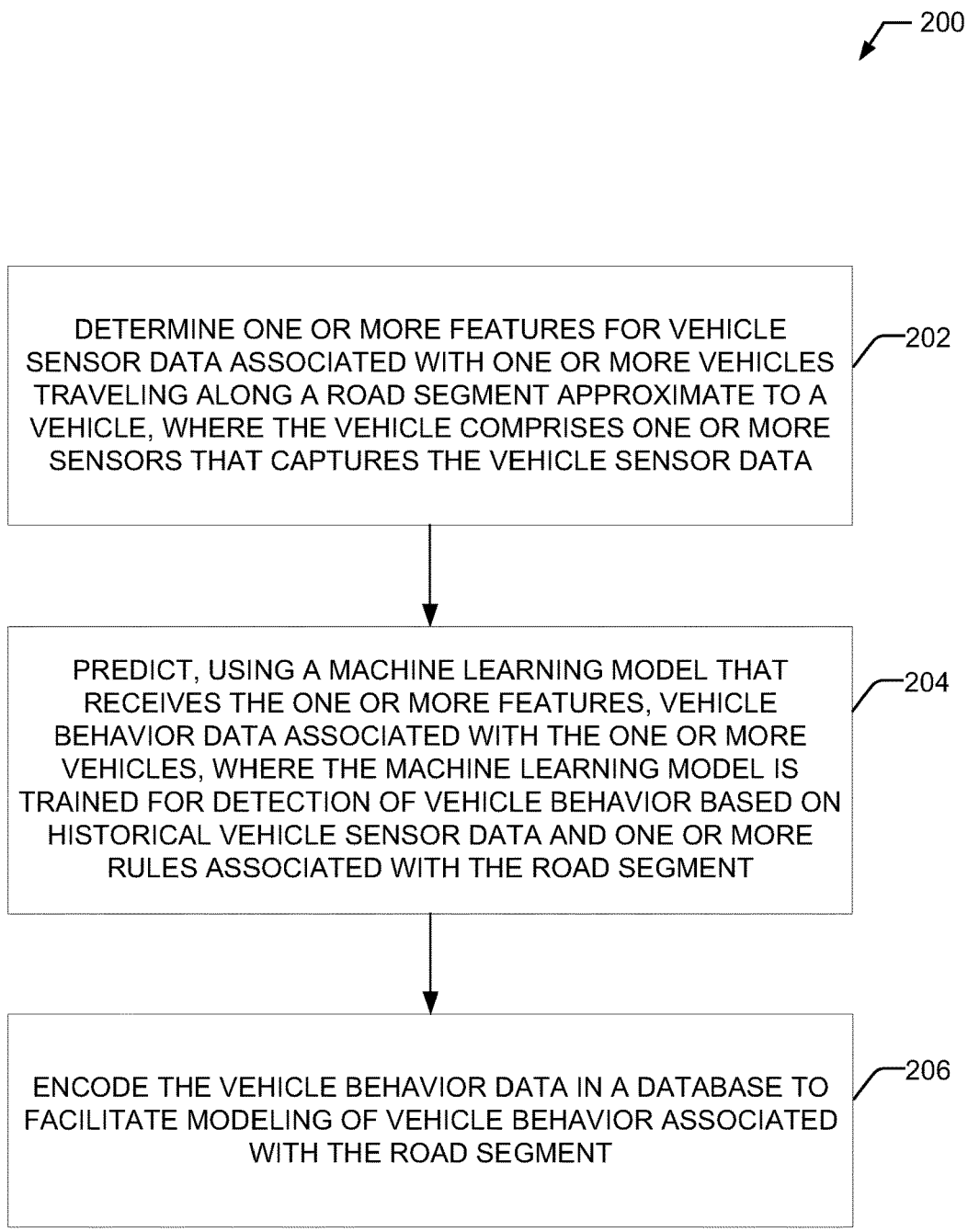
Figure 3:
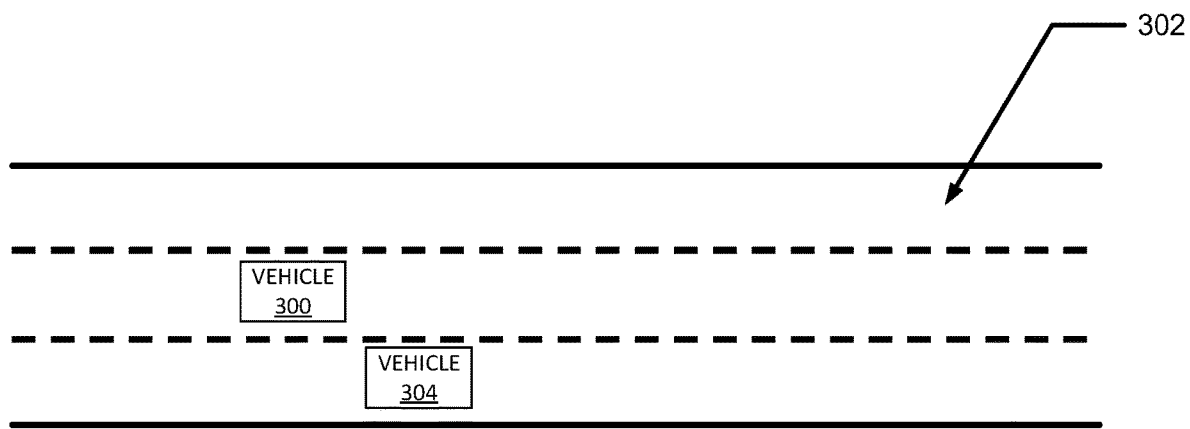
Figure 4:
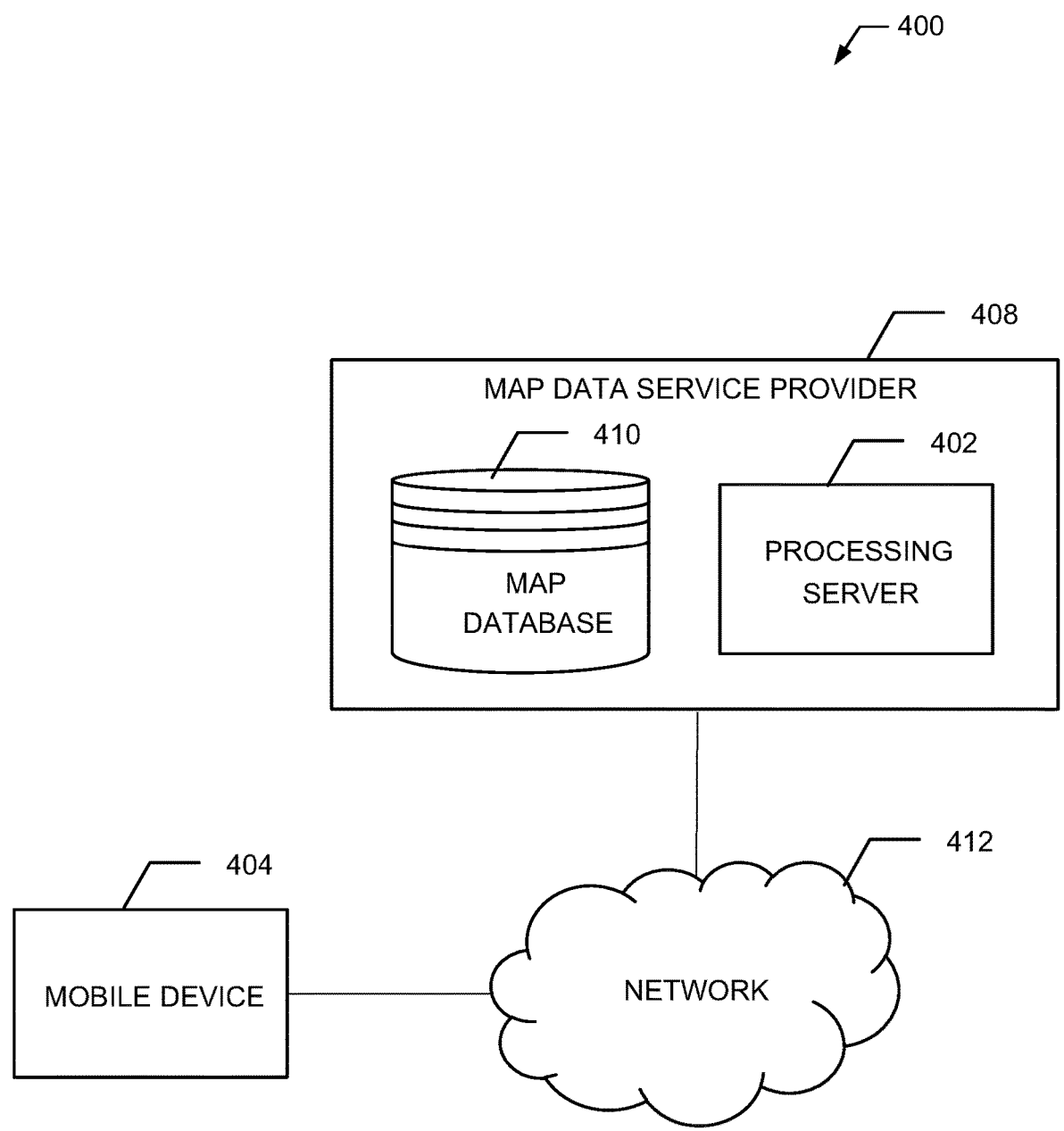
Figure 5:
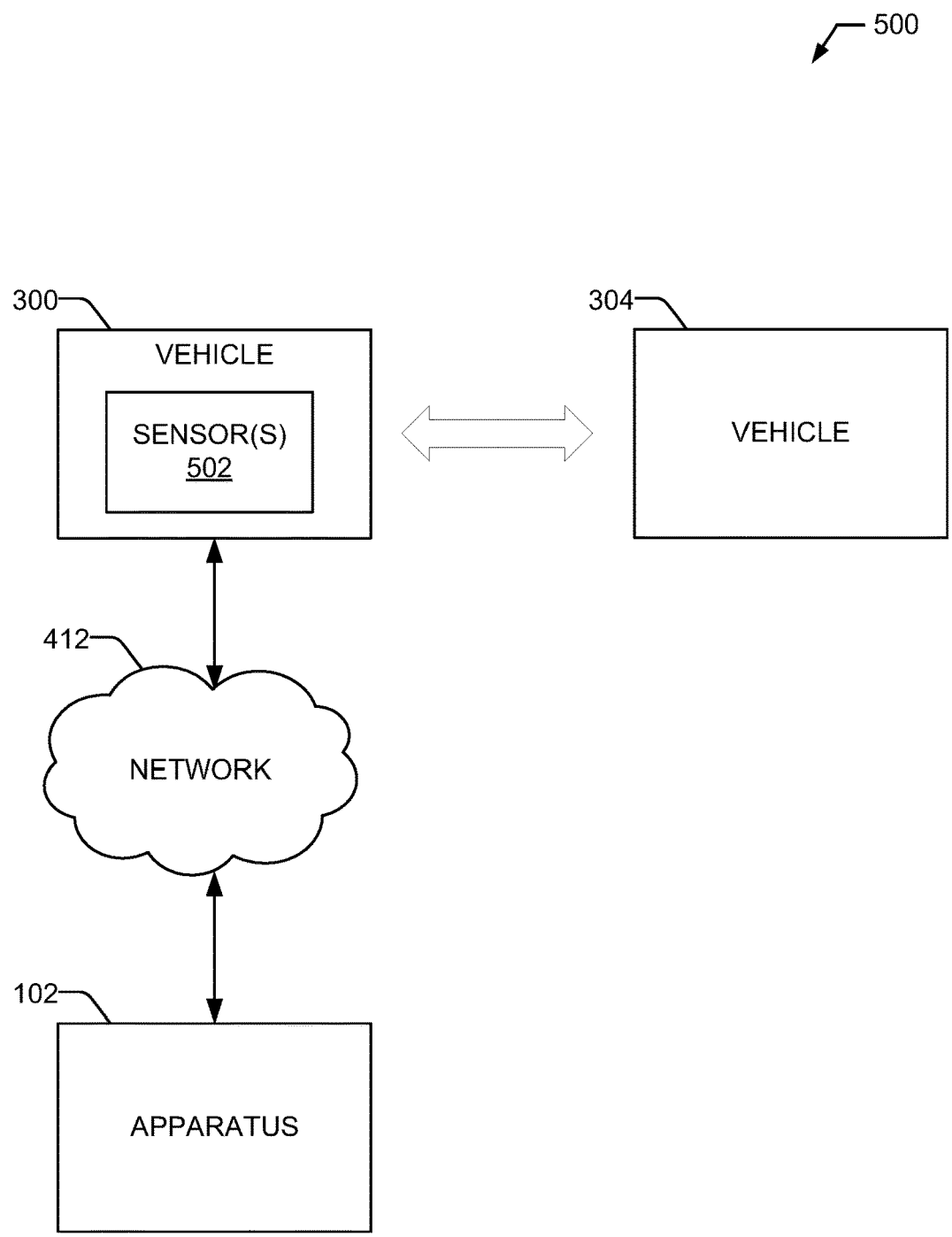
Figure 6:
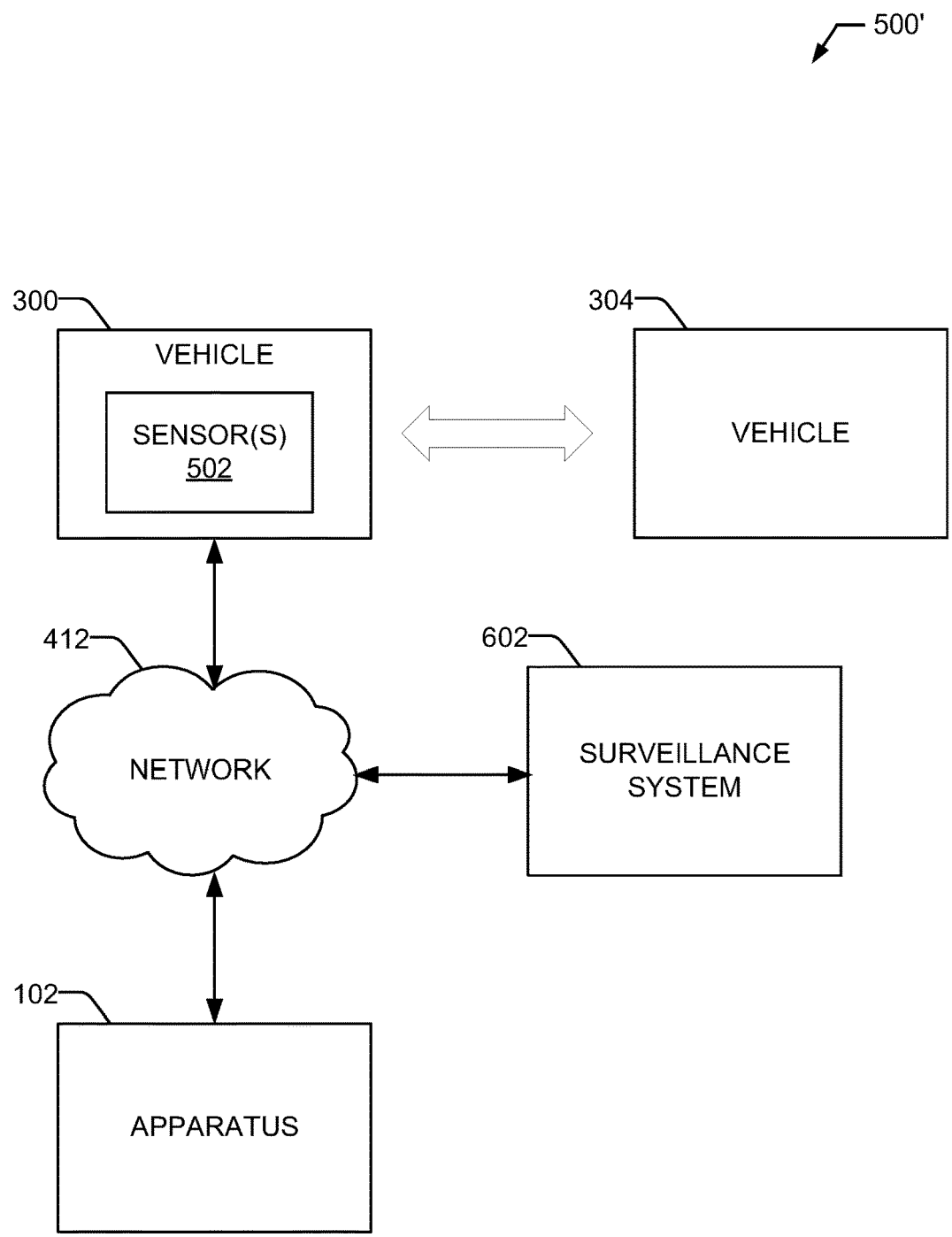
Figure 7:
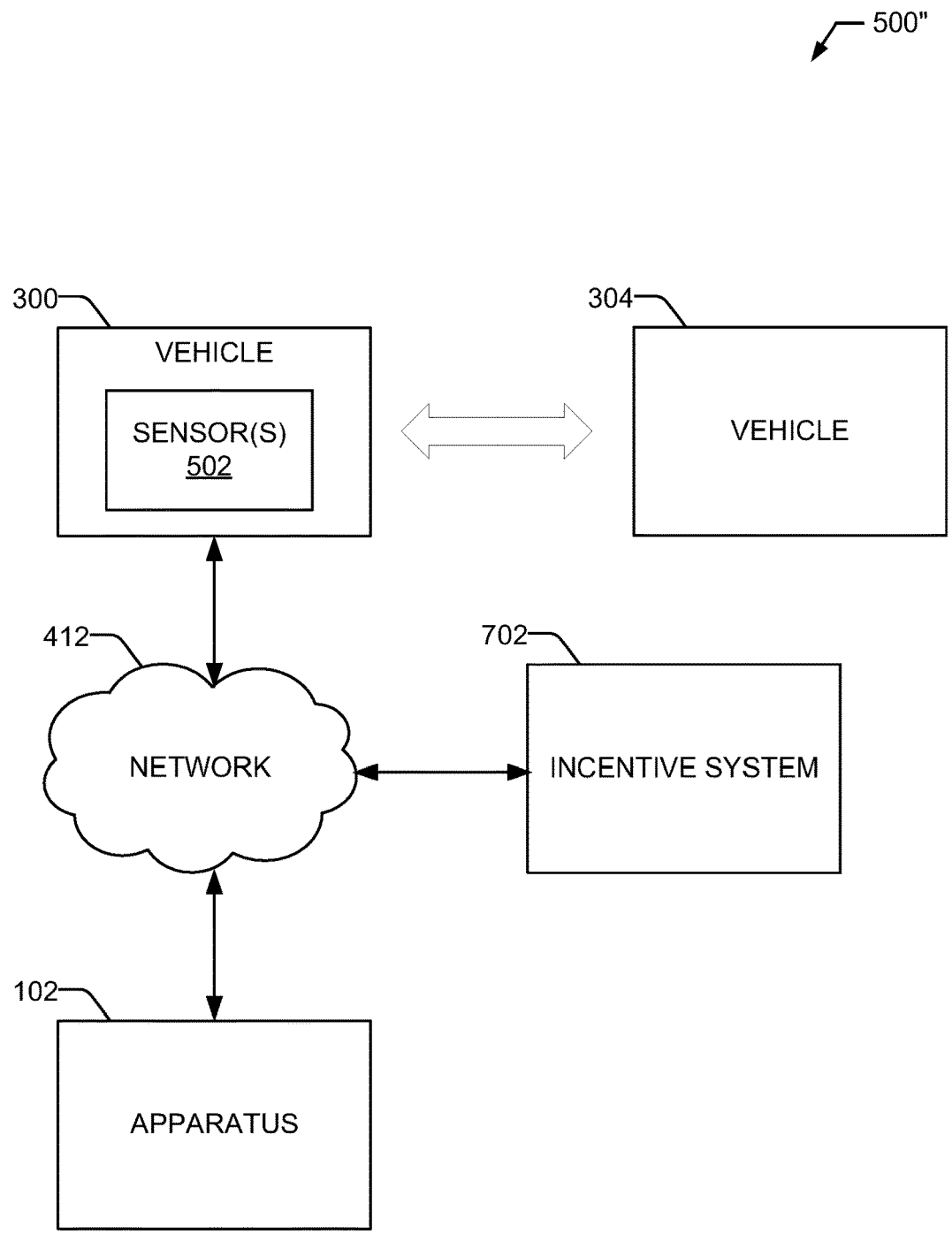
Figure 8:
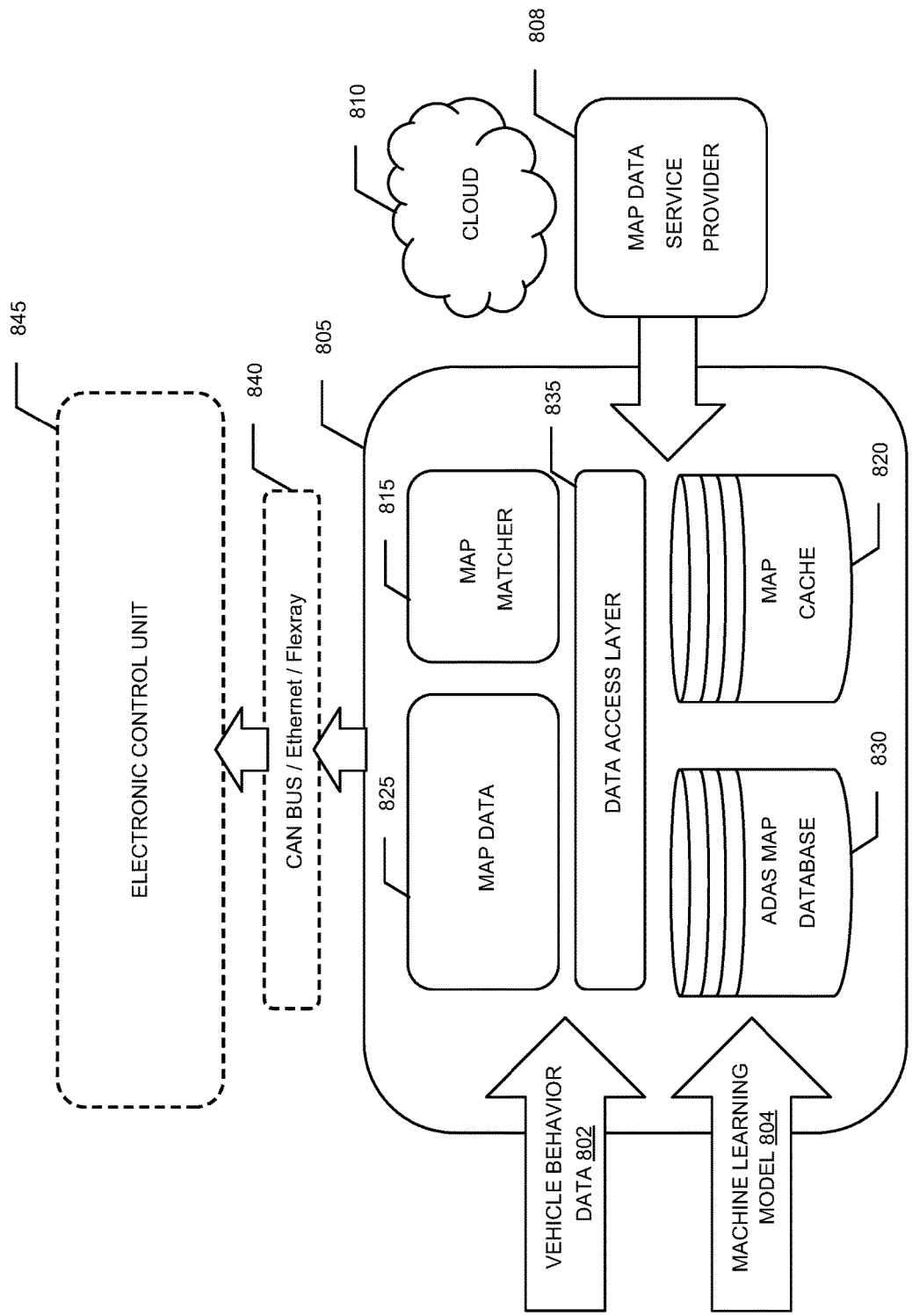

Having thus described certain embodiments of the disclosure in general terms, reference will now be made to the accompanying drawings, which are not necessarily drawn to scale, and wherein:

FIG. 1 is a block diagram of a system including an apparatus for surveillance of road environments via deep learning in accordance with one or more example embodiments of the present disclosure;

FIG. 2 is a flowchart illustrating operations performed, such as by the apparatus of FIG. 1, in order to provide surveillance of road environments via deep learning in accordance with one or more example embodiments of the present disclosure;

FIG. 3 illustrates vehicles with respect to a road segment in accordance with one or more example embodiments of the present disclosure;

FIG. 4 is a block diagram of a system to facilitate generation of map data in accordance with one or more example embodiments of the present disclosure;

FIG. 5 illustrates an exemplary system in accordance with one or more example embodiments of the present disclosure;

FIG. 6 illustrates another exemplary system associated with a surveillance system in accordance with one or more example embodiments of the present disclosure;

FIG. 7 illustrates another exemplary system associated with an incentive system in accordance with one or more example embodiments of the present disclosure; and FIG. 8 is an example embodiment of an architecture specifically configured for implementing embodiments described herein.

DETAILED DESCRIPTION

Some embodiments of the present disclosure will now be described more fully hereinafter with reference to the accompanying drawings, in which some, but not all, embodiments of the disclosure are shown. Indeed, various embodiments of the disclosure can be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms can be used interchangeably to refer to data capable of being transmitted, received and/or stored in accordance with embodiments of the present disclosure. Thus, use of any such terms should not be taken to limit the spirit and scope of embodiments of the present disclosure.

Surveillance of road environments associated with vehicles is generally difficult due to, for example, the high degree of monitoring and/or the high degree of sensor data related to surveillance of road environments associated with vehicles. Conventional surveillance techniques of road environments associated with vehicles are costly and do not take advantage of sensor data associated with the vehicles. For example, install surveillance cameras in a road environment is generally costly and/or requires modifications to an infrastructure associated with the road environment. In another example, employing drones to provide surveillance of a road environment is generally costly and/or complex.

To address these and/or other issues, a method, apparatus and computer program product are provided in accordance with an example embodiment in order to provide surveillance of road environments via deep learning. In an embodiment, vehicle behavior is determined for vehicles associated with a road environment using deep learning. In one or more embodiments, the vehicle behavior can be employed for surveillance of roadways, law enforcement related to roadways, vehicle and driver behavior observation surveillance and tracking, incentives related to vehicle behavior, and/or cryptocurrency-based incentivization. In one or more embodiments, technologies such as image perception, deep learning, blockchain cryptocurrencies and/or one or more other technologies can be employed to facilitate determining and/or managing vehicle behavior for vehicles associated with a road environment. In one or more embodiments, one or more cameras and/or one or more other sensors of a vehicle can be employed to record an environment surrounding the vehicle. Additionally or alternatively, in one or more embodiments, processing (e.g., on-board a vehicle or off-board a vehicle) of data captured from the one or more cameras and/or the one or more other sensors can be employed to detect other vehicle behavior relative to one or more rules (e.g., laws of the roadway). In one or more embodiments, the detected vehicle behavior can be rewarded and/or penalized (e.g., relative to the one or more laws).

In one or more embodiments, an automated vehicle behavior system can be provided. In one or more embodiments, the automated vehicle behavior system can include an actor intent classifier. In one or more embodiments, a system can be provided to auto-assign fault for negative actor events and/or negative vehicle behavior. Additionally or alternatively, the system will can reward positive actor events and/or positive vehicle behavior. In certain embodiments, a system can be provided such that behaviors of a human-driven vehicle and surrounding vehicles can be recorded, analyzed and/or provided to a surveillance system (e.g., a law enforcement system) for generating automated actions (e.g., automated ticketing and/or billing).

In certain embodiments, in a semi-autonomous driving environment (e.g., a Level 2 autonomous driving level or a Level 3 driving autonomous level), where humans are involved in navigation of a vehicle, a system can provide a positive incentive versus a negative disincentive to driving behavior. In certain embodiments, a cryptocurrency token system is employed where tokens are awarded to drivers based on positive driving behavior (e.g., according to the one or more rules) and/or where tokens are deducted for negative driving behavior (e.g., according to the one or more rules). For example, a swift double-lane change of a vehicle to exit a roadway segment can be considered negative driving behavior.

In certain embodiments, a reinforcement learning-based system can be provided within a vehicle (e.g., an autonomous vehicle or a semi-autonomous vehicle), along with a vehicle-to-everything (V2X) network feed to other vehicles and/or surveillance systems (e.g., law enforcement systems).

The autonomous/semi-autonomous vehicle obviously will sense its environment and take actions to affect the state of its environment. In certain embodiments, one or more goals relating to a state of an environment of the vehicle (e.g., one or more goals that are derived from the one or more rules) can be employed. Thus, in certain embodiments, the vehicle can be configured to navigate based on particular vehicle behavior levels to maximize a reward such that the signal is received not only by sensing a current environment, but over the V2X network as well. In certain embodiments, geofencing is employed for access and/or activation of a system that provides surveillance of road environments via deep learning. In certain embodiments, a cryptocurrency token reward is provided for vehicle behavior and/or for a vehicle acting as a monitoring node. In certain embodiments, vehicle behaviors are mapped to map regions. For example, in certain embodiments, an abstract layer in a map can be employed for modeling vehicle behaviors based on features such as, for example, location, region, make of a vehicle, model of a vehicle, a year of a vehicle, an identification for a vehicle, a time of day, a time of year, etc.

Accordingly, in certain embodiments, surveillance of road environments via deep learning can provide improved autonomous driving and/or vehicle localization for a vehicle. Moreover, surveillance of road environments via deep learning can provide additional dimensionality and/or advantages for one or more sensors of a vehicle. Prediction of vehicle behavior using deep learning can also provide a low cost and/or efficient solution for improved autonomous driving and/or vehicle safety. Computational resources for improved autonomous driving can also be conserved. Prediction of vehicle behavior using deep learning can also provide a cost effective and/or efficient solution for improved autonomous driving and/or vehicle localization. Computational resources for improved autonomous driving can also be relatively limited in order to allow the computational resources to be utilized for other purposes. Prediction of vehicle behavior using deep learning may additionally facilitate improved navigation of a vehicle, improved route guidance for a vehicle, improved semi-autonomous vehicle control, and/or improved fully autonomous vehicle control.

With reference to FIG. 1, a system 100 configured to surveillance of road environments via deep learning is depicted, in accordance with one or more embodiments of the present disclosure. In the illustrated embodiment, the system 100 includes an apparatus 102 and a map database 104. As described further below, the apparatus 102 is configured in accordance with an example embodiment of the present disclosure to assist navigation of a vehicle and/or to autonomous driving for a vehicle. The apparatus 102 can be embodied by any of a wide variety of computing devices including, for example, a computer system of a vehicle, a vehicle system of a vehicle, a navigation system of a vehicle, a control system of a vehicle, an electronic control unit of a vehicle, an autonomous vehicle control system (e.g., an autonomous-driving control system) of a vehicle, a mapping system of a vehicle, an Advanced Driver Assistance System module (ADAS of a vehicle), or any other type of computing device carried by or remote from the vehicle including, for example, a server or a distributed network of computing devices.

In an example embodiment where some level of vehicle autonomy is involved, the apparatus 102 can be embodied or partially embodied by a computing device of a vehicle that supports safety-critical systems such as the powertrain (engine, transmission, electric drive motors, etc.), steering (e.g., steering assist or steer-by-wire), and/or braking (e.g., brake assist or brake-by-wire). However, as certain embodiments described herein may optionally be used for map generation, map updating, and map accuracy confirmation, other embodiments of the apparatus may be embodied or partially embodied as a mobile terminal, such as a personal digital assistant (PDA), mobile telephone, smart phone, personal navigation device, smart watch, tablet computer, camera or any combination of the aforementioned and other types of voice and text communications systems. Regardless of the type of computing device that embodies the apparatus 102, the apparatus 102 of an example embodiment includes, is associated with or otherwise is in communication with processing circuitry 106, memory 108 and optionally a communication interface 110.

In some embodiments, the processing circuitry 106 (and/or co-processors or any other processors assisting or otherwise associated with the processing circuitry 106) can be in communication with the memory 108 via a bus for passing information among components of the apparatus 102. The memory 108 can be non-transitory and can include, for example, one or more volatile and/or non-volatile memories. In other words, for example, the memory 108 may be an electronic storage device (for example, a computer readable storage medium) comprising gates configured to store data (for example, bits) that can be retrievable by a machine (for example, a computing device like the processing circuitry 106). The memory 108 can be configured to store information, data, content, applications, instructions, or the like for enabling the apparatus 100 to carry out various functions in accordance with an example embodiment of the present disclosure. For example, the memory 108 can be configured to buffer input data for processing by the processing circuitry 106. Additionally or alternatively, the memory 108 can be configured to store instructions for execution by the processing circuitry 106.

The processing circuitry 106 can be embodied in a number of different ways. For example, the processing circuitry 106 may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry 106 can include one or more processing cores configured to perform independently. A multi-core processor can enable multiprocessing within a single physical package. Additionally or alternatively, the processing circuitry 106 can include one or more processors configured in tandem via the bus to enable independent execution of instructions, pipelining and/or multithreading.

In an example embodiment, the processing circuitry 106 can be configured to execute instructions stored in the memory 108 or otherwise accessible to the processing circuitry 106. Alternatively or additionally, the processing circuitry 106 can be configured to execute hard coded functionality. As such, whether configured by hardware or software methods, or by a combination thereof, the processing circuitry 106 can represent an entity (for example, physically embodied in circuitry) capable of performing operations according to an embodiment of the present disclosure while configured accordingly. Thus, for example, when the processing circuitry 106 is embodied as an ASIC, FPGA or the like, the processing circuitry 106 can be specifically configured hardware for conducting the operations described herein. Alternatively, as another example, when the processing circuitry 106 is embodied as an executor of software instructions, the instructions can specifically configure the processing circuitry 106 to perform the algorithms and/or operations described herein when the instructions are executed. However, in some cases, the processing circuitry 106 can be a processor of a specific device (for example, a computing device) configured to employ an embodiment of the present disclosure by further configuration of the processor by instructions for performing the algorithms and/or operations described herein. The processing circuitry 106 can include, among other things, a clock, an arithmetic logic unit (ALU) and/or one or more logic gates configured to support operation of the processing circuitry 106.

The apparatus 102 of an example embodiment can also optionally include the communication interface 110 that can be any means such as a device or circuitry embodied in either hardware or a combination of hardware and software that is configured to receive and/or transmit data from/to other electronic devices in communication with the apparatus 102, such as the map database 104 that stores data (e.g., map data, features data, vehicle behavior data, autonomous level data, location data, geo-referenced locations, time data, timestamp data, temporal data, vehicle data, vehicle version data, software version data, hardware version data, vehicle speed data, distance data, vehicle context data, statistical data, etc.) generated and/or employed by the processing circuitry 106. Additionally or alternatively, the communication interface 110 can be configured to communicate in accordance with various wireless protocols including, but not limited to, Global System for Mobile Communications (GSM), Long Term Evolution (LTE), fifth-generation (5G), etc. In this regard, the communication interface 110 can include, for example, an antenna (or multiple antennas) and supporting hardware and/or software for enabling communications with a wireless communication network. In this regard, the communication interface 110 can include, for example, an antenna (or multiple antennas) and supporting hardware and/or software for enabling communications with a wireless communication network. Additionally or alternatively, the communication interface 110 can include the circuitry for interacting with the antenna(s) to cause transmission of signals via the antenna(s) or to handle receipt of signals received via the antenna(s). In some environments, the communication interface 110 can alternatively or also support wired communication and/or may alternatively support vehicle to vehicle or vehicle to infrastructure wireless links.

In certain embodiments, the apparatus 102 can be equipped or associated with one or more sensors 112, such as one or more camera sensors, one or more infrared (IR) camera sensors; one or more three-dimensional (3D) camera data; one or more 360° camera sensors, one or more Global Positioning System (GPS) sensors, one or more accelerometer sensors, one or more Light Detection and Ranging (LiDAR) sensors, one or more radar sensors, one or more gyroscope sensors, one or more ultrasonic sensors, one or more electromagnetic sensors, and/or one or more other sensors. Any of the one or more sensors 112 may be used to sense information regarding surrounding environment, movement, positioning, and/or orientation of the apparatus 102 and/or one or more vehicles proximate to the apparatus 102 for use in surveillance of vehicles and/or a road environment associated with vehicles, vehicle behavior prediction, navigation assistance and/or autonomous vehicle control, as described herein according to example embodiments.

FIG. 2 illustrates a flowchart depicting a method 200 according to an example embodiment of the present disclosure. It will be understood that each block of the flowchart and combination of blocks in the flowchart can be implemented by various means, such as hardware, firmware, processor, circuitry, and/or other communication devices associated with execution of software including one or more computer program instructions. For example, one or more of the procedures described above can be embodied by computer program instructions. In this regard, the computer program instructions which embody the procedures described above can be stored, for example, by the memory 108 of the apparatus 102 employing an embodiment of the present disclosure and executed by the processing circuitry 106. As will be appreciated, any such computer program instructions can be loaded onto a computer or other programmable apparatus (for example, hardware) to produce a machine, such that the resulting computer or other programmable apparatus implements the functions specified in the flowchart blocks. These computer program instructions can also be stored in a computer-readable memory that can direct a computer or other programmable apparatus to function in a particular manner, such that the instructions stored in the computer-readable memory produce an article of manufacture the execution of which implements the function specified in the flowchart blocks. The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Referring now to FIG. 2, the operations performed, such as by the apparatus 102 of FIG. 1, in order to provide for surveillance of road environments via deep learning, in accordance with one or more embodiments of the present disclosure. As shown in block 202 of FIG. 2, the apparatus 102 includes means, such as the processing circuitry 106, the memory 108, or the like, configured to determine one or more features for vehicle sensor data associated with one or more vehicles traveling along a road segment proximate to a vehicle, where the vehicle comprises one or more sensors that captures the vehicle sensor data. For instance, in one or more embodiments, the apparatus 102, such as the processing circuitry 106, can be configured to identify one or more features for the vehicle sensor data associated with the one or more vehicles traveling along the road segment proximate to the vehicle. In one or more embodiments, the apparatus 102, such as the processing circuitry 106, can be configured to determine the one or more features for the vehicle sensor data in response to a determination that the vehicle is associated with a defined geofence region of the road segment. In one or more embodiments, the apparatus 102, such as the processing circuitry 106, can be configured to receive the vehicle sensor data from the vehicle. In one or more embodiments, the one or more features can be related to vehicle behavior for the one or more vehicles traveling along the road segment proximate to the vehicle.

The one or more features can be, for example, one or more features associated with camera data captured by the vehicle, image data captured by the vehicle, video data captured by the vehicle, LiDAR data captured by the vehicle, radar data captured by the vehicle, ultrasonic sensor data captured by the vehicle, electromagnetic sensor data captured by the vehicle, IR camera data captured by the vehicle, 3D camera data captured by the vehicle, 360° camera data captured by the vehicle, autonomous driving data related to the vehicle and/or the one or more vehicles traveling along the road segment proximate to the vehicle, location data related to the vehicle and/or the one or more vehicles traveling along the road segment proximate to the vehicle, time data (e.g., timestamp data) related to capturing of the vehicle sensor data, vehicle data related to the vehicle and/or the one or more vehicles traveling along the road segment proximate to the vehicle, vehicle version data related to the vehicle and/or the one or more vehicles traveling along the road segment proximate to the vehicle, vehicle context data related to the vehicle and/or the one or more vehicles traveling along the road segment proximate to the vehicle, and/or other data associated with the vehicle sensor data. In one or more embodiments, the one or more features can be associated with one or more points of interest associated with the vehicle sensor data, one or more feature descriptors for the vehicle sensor data, and/or one or more other ground truth features of the vehicle sensor data. In one or more embodiments, the apparatus 102, such as the processing circuitry 106, can be configured to generate the one or more features based on one or more image processing techniques, one or more feature extraction techniques, one or more image recognition techniques, one or more object detection techniques, one or more pattern recognition techniques, one or more computer vision techniques, and/or one or more other technical techniques related to identifying features with respect to the vehicle sensor data. In one or more embodiments, the one or more features can be one or more feature vectors comprise a set of data elements that represent a respective feature. In one or more embodiments, a feature vector associated with a feature can comprise one or more portions of an image and/or a set of pixel data. In an aspect, the one or more features can be one or more features provided to a machine learning model for training a machine learning model and/or predicting vehicle behavior.

Autonomous driving has become a focus of recent technology with recent advances in machine learning, computer vision, and computing power able to conduct real-time mapping and sensing of a vehicle's environment. Such an understanding of the environment enables autonomous driving in two distinct ways. Primarily, real-time or near real-time sensing of the environment can provide information about potential obstacles, the behavior of others on the roadway, and areas that are navigable by the vehicle. An understanding of the location of other vehicles and/or what the other vehicles have done and may be predicted to do may be useful for a vehicle (or apparatus 102) to safely navigate via the road segment.

Autonomous vehicles or vehicles with some level of autonomous controls provide some degree of vehicle control that was previously performed by a person driving a vehicle. Removing some or all of the responsibilities of driving from a person and automating those responsibilities require a high degree of confidence in performing those responsibilities in a manner at least as good as a human driver. For example, maintaining a vehicle's position within a lane by a human involves steering the vehicle between observed lane markings and determining a lane when lane markings are faint, absent, or not visible due to weather (e.g., heavy rain, snow, bright sunlight, etc.). As such, it is desirable for the autonomous vehicle to be equipped with sensors sufficient to observe road features, and a controller that is capable of processing the signals from the sensors observing the road features, interpret those signals, and provide vehicle control to maintain the lane position of the vehicle based on the sensor data. Maintaining lane position is merely one illustrative example of a function of autonomous or semi-autonomous vehicles that demonstrates the sensor level and complexity of autonomous driving. However, autonomous vehicle capabilities, particularly in fully autonomous vehicles, must be capable of performing all driving functions. As such, the vehicles must be equipped with sensor packages that enable the functionality in a safe manner.

In one or more embodiments, the autonomous driving data can be related to one or more sensors that facilitate autonomous driving for the vehicle and/or the one or more vehicles traveling along the road segment proximate to the vehicle. In one or more embodiments, the autonomous driving data can provide an indication regarding an autonomous level for the one or more vehicles traveling along the road segment proximate to the vehicle. In one or more embodiments, the autonomous driving data can include an autonomous level transition reason such as, for example, one or more reasons why a vehicle transitioned from a first autonomous level to a second autonomous level while traveling along the road segment. In one or more embodiments, the level of defined autonomy indicated by the autonomous driving data can include Level 0 that corresponds to no automation for a vehicle traveling along the road segment proximate to the vehicle, Level 1 that corresponds to a certain degree of driver assistance for a vehicle traveling along the road segment proximate to the vehicle, Level 2 that corresponds to partial automation for a vehicle traveling along the road segment proximate to the vehicle, Level 3 that corresponds to conditional automation for a vehicle traveling along the road segment proximate to the vehicle, Level 4 that corresponds to high automation for a vehicle traveling along the road segment proximate to the vehicle, Level 5 that corresponds to full automation for a vehicle traveling along the road segment proximate to the vehicle, and/or another sub-level associated with a degree of autonomous driving for a vehicle traveling along the road segment proximate to the vehicle.

In one or more embodiments, the apparatus 102, such as the processing circuitry 106, can be configured to additionally or alternatively access the location data associated with the vehicle and/or the one or more vehicles traveling along the road segment proximate to the vehicle. In one or more embodiments, the location data associated with the vehicle and/or the one or more vehicles traveling along the road segment proximate to the vehicle can include geographic coordinates for the vehicle and/or the one or more vehicles traveling along the road segment proximate to the vehicle. In an embodiment, the location data associated with the vehicle and/or the one or more vehicles traveling along the road segment proximate to the vehicle can include latitude data and/or longitude data defining the location of the vehicle and/or the one or more vehicles traveling along the road segment proximate to the vehicle. In an aspect, the location data can be generated based on the one or more sensors 112. For example, in an embodiment, the apparatus 102, such as the processing circuitry 106, can receive the location data associated with the vehicle and/or the one or more vehicles traveling along the road segment proximate to the vehicle from a GPS or other location sensor of the vehicle and/or the one or more vehicles traveling along the road segment proximate to the vehicle. In another embodiment, the apparatus 102, such as the processing circuitry 106, can receive the location data associated with the vehicle and/or the one or more vehicles traveling along the road segment proximate to the vehicle from a LiDAR sensor of the vehicle and/or the one or more vehicles traveling along the road segment proximate to the vehicle. In yet another embodiment, the apparatus 102, such as the processing circuitry 106, can receive the location data associated with the vehicle and/or the one or more vehicles traveling along the road segment proximate to the vehicle from one or more ultrasonic sensors and/or one or more infrared sensors of the vehicle and/or the one or more vehicles traveling along the road segment proximate to the vehicle. Additionally, in one or more embodiments, the location data associated with the vehicle and/or the one or more vehicles traveling along the road segment proximate to the vehicle can include information associated with the autonomous driving data.

In one or more embodiments, the apparatus 102, such as the processing circuitry 106, can be configured to additionally or alternatively access time data associated with the vehicle and/or the one or more vehicles traveling along the road segment proximate to the vehicle. The time data can be associated with a timestamp for capturing and/or receiving the vehicle sensor data. In certain embodiments, the apparatus 102, such as the processing circuitry 106, can be configured to additionally or alternatively receive vehicle data associated with a vehicle type for the vehicle and/or the one or more vehicles traveling along the road segment proximate to the vehicle. In certain embodiments, the apparatus 102, such as the processing circuitry 106, can be configured to additionally or alternatively receive vehicle version data associated with one or more components of the vehicle and/or the one or more vehicles traveling along the road segment proximate to the vehicle. In certain embodiments, the apparatus 102, such as the processing circuitry 106, can be configured to additionally or alternatively receive vehicle context data associated with a driving condition, a weather condition, an environmental condition, a road segment condition and/or another condition related to the vehicle and/or the one or more vehicles traveling along the road segment proximate to the vehicle.

An example of the vehicle and another vehicle traveling along the road segment proximate to the vehicle is depicted in FIG. 3. As shown in FIG. 3, a vehicle 300 travels along a road segment 302. In one or more embodiments, the vehicle 300 can be an automobile where tires of the vehicle 300 are in contact with a road surface of the road segment 302. In certain embodiments, the vehicle 300 can be associated with a particular level of defined autonomy while traveling along the road segment 302. In one or more embodiments, the vehicle 300 can be the vehicle that comprises the one or more sensors that captures the vehicle sensor data. In certain embodiments, the vehicle 300 can be an autonomous vehicle or a semi-autonomous vehicle. Additionally, a vehicle 304 can be traveling along the road segment 302 proximate to the vehicle 300. In one or more embodiments, the vehicle 304 can be another automobile where tires of the vehicle 304 are in contact with a road surface of the road segment 302. In certain embodiments, the vehicle 304 can be associated with a particular level of defined autonomy while traveling along the road segment 304. In one or more embodiments, the vehicle 304 can be a vehicle from the one or more vehicles traveling proximate to the vehicle (e.g., the vehicle 300) that comprises the one or more sensors that captures the vehicle sensor data. For instance, in one or more embodiments, at least a portion of the vehicle sensor data can be related to the vehicle 304. In certain embodiments, the vehicle 304 can be an autonomous vehicle or a semi-autonomous vehicle.

As shown in block 204 of FIG. 2, the apparatus 102 includes means, such as the processing circuitry 106, the memory 108, or the like, configured to predict, using a machine learning model that receives the one or more features, vehicle behavior data associated with the one or more vehicles, where the machine learning model is trained for detection of vehicle behavior based on historical vehicle sensor data and one or more rules (e.g., one or more traffic laws) associated with the road segment. For instance, in an embodiment, the machine learning model can be a machine learning model for detecting vehicle behavior. In one or more embodiments, the machine learning model can include model data and/or a prediction algorithm associated with detecting vehicle behavior. In an embodiment, the machine learning model can be a decision tree model associated with a tree-like decision structure to facilitate detecting vehicle behavior. In another embodiment, the machine learning model can be a random forest model associated with one or more random decision forest structures to facilitate detecting vehicle behavior. In yet another embodiment, the machine learning model can be a neural network model (e.g., a deep learning model, an artificial neural network model, a convolutional neural network model, etc.) associated with artificial neural structures, convolutional layers, pooling layers, fully connected layers, connections, and/or weights to facilitate detecting vehicle behavior. In one or more embodiments, the one or more features can be provided as input to the machine learning model. Furthermore, based on the one or more features, the machine learning model can be configured to provide the vehicle behavior data. In one or more embodiments, the vehicle behavior data can be a classification of vehicle behavior, a prediction of vehicle behavior, a label related to vehicle behavior, an inference related to vehicle behavior, and/or other machine learning output data related to vehicle behavior.

In certain embodiments, to facilitate surveillance of the road segment (e.g., the road segment 302), autonomous driving of vehicles associated with the road segment (e.g., the road segment 302), prediction of vehicle behavior for vehicles traveling along the road segment (e.g., the road segment 302), and/or incentives associated with vehicle behavior for vehicles traveling along the road segment (e.g., the road segment 302), the apparatus 102 can support a mapping, navigation, and/or autonomous driving application so as to present maps or otherwise provide navigation or driver assistance, such as in an example embodiment in which map data is created or updated using methods described herein. For example, the apparatus 102 can provide for display of a map and/or instructions for following a route within a network of roads via a user interface (e.g., a graphical user interface). In order to support a mapping application, the apparatus 102 can include or otherwise be in communication with a geographic database, such as map database 104, a geographic database stored in the memory 108, and/or map database 410 shown in FIG. 4. For example, the geographic database can include node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology can be used, such as electronic horizon sensors, radar, LiDAR, ultrasonic sensors and/or infrared sensors. In one or more embodiments, the other autonomous level data can be stored in the map database 104, the map database 410, and/or another database accessible by the apparatus 102.

In certain embodiments, a navigation system user interface and/or an autonomous driving user interface can be provided to provide driver assistance to a user traveling along a network of roadways where data collected from the vehicle (e.g., the vehicle 300) associated with the navigation system user interface and/or one or more vehicles (e.g., the vehicle 304) proximate the vehicle can aid in establishing a position of the vehicle along a road segment (e.g., the road segment 302) and/or can provide assistance for autonomous or semi-autonomous vehicle control of the vehicle. Autonomous vehicle control can include driverless vehicle capability where all vehicle functions are provided by software and hardware to safely drive the vehicle along a path identified by the vehicle. Semi-autonomous vehicle control can be any level of driver assistance from adaptive cruise control, to lane-keep assist, or the like. Establishing vehicle location and position along a road segment can provide information useful to navigation and autonomous or semi-autonomous vehicle control by establishing an accurate and highly specific position of the vehicle on a road segment and even within a lane of the road segment such that map features in the map, e.g., a high definition (HD) map, associated with the specific position of the vehicle can be reliably used to aid in guidance and vehicle control.

A map service provider database can be used to provide driver assistance, such as via a navigation system and/or through an Advanced Driver Assistance System (ADAS) having autonomous or semi-autonomous vehicle control features. Referring back to FIG. 4, illustrated is a communication diagram of an example embodiment of a system for implementing example embodiments described herein. The illustrated embodiment of FIG. 4 includes a mobile device 404, which can be, for example, the apparatus 102 of FIG. 1, such as a mobile phone, an in-vehicle navigation system, an ADAS, or the like. The illustrated embodiment of FIG. 4 also includes a map data service provider 408. The mobile device 404 and the map data service provider 408 can be in communication via a network 412. The network 412 can be any form of wireless or partially wireless network as will be described further below. Additional, different, or fewer components can be provided. For example, many mobile devices 404 can connect with the network 412. In an embodiment, the map data service provider can be a cloud service. For instance, in certain embodiments, the map data service provider 408 can provide cloud-based services and/or can operate via a hosting server that receives, processes, and provides data to other elements of the system 400.

The map data service provider 408 can include a map database 410 that can include node data, road segment data or link data, point of interest (POI) data, traffic data or the like. In one embodiment, the map database 410 can be different than the map database 104. In another embodiment, at least a portion of the map database 410 can correspond to the map database 104. The map database 410 can also include cartographic data, routing data, and/or maneuvering data. According to some example embodiments, the road segment data records can be links or segments representing roads, streets, or paths, as can be used in calculating a route or recorded route information for determination of one or more personalized routes. The node data can be end points corresponding to the respective links or segments of road segment data. The road link data and the node data can represent a road network, such as used by vehicles, cars, trucks, buses, motorcycles, and/or other entities. Optionally, the map database 410 can contain path segment and node data records or other data that can represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 410 can include data about the POIs and their respective locations in the POI records. The map database 410 can include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 410 can include event data (e.g., traffic incidents, construction activities, scheduled events, unscheduled events, etc.) associated with the POI data records or other records of the map database 410.

The map database 410 can be maintained by the map data service provider 408 and can be accessed, for example, by a processing server 402 of the map data service provider 408. By way of example, the map data service provider 408 can collect geographic data and/or dynamic data to generate and enhance the map database 410. In one example, the dynamic data can include traffic-related data. There can be different ways used by the map data service provider 408 to collect data. These ways can include obtaining data from other sources, such as municipalities or respective geographic authorities, such as via global information system databases. In addition, the map data service provider 408 can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that can be available is vehicle data provided by vehicles, such as provided, e.g., as probe points, by mobile device 404, as they travel the roads throughout a region.

In certain embodiments, at least a portion of the map database 104 can be included in the map database 410. In an embodiment, the map database 410 can be a master map database, such as an HD map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems. For example, geographic data can be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 404, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map database 410 of the map data service provider 408 can be a master geographic database, but in alternate embodiments, a client side map database can represent a compiled navigation database that can be used in or with end user devices (e.g., mobile device 404) to provide navigation and/or map-related functions. For example, the map database 410 can be used with the mobile device 404 to provide an end user with navigation features. In such a case, the map database 410 can be downloaded or stored on the end user device which can access the map database 410 through a wireless or wired connection, such as via a processing server 402 and/or the network 412, for example.

In one embodiment, as noted above, the end user device or mobile device 404 can be embodied by the apparatus 102 of FIG. 1 and can include an ADAS which can include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, a server and/or other device that can perform navigation-related functions, such as digital routing and map display. An end user can use the mobile device 404 for navigation and map functions such as guidance and map display, for example, and for determination of useful driver assistance information, according to some example embodiments.

As shown in block 206 of FIG. 2, the apparatus 102 includes means, such as the processing circuitry 106, the memory 108, or the like, configured to encode the vehicle behavior data in a database to facilitate modeling of vehicle behavior associated with the road segment. For example, in one or more embodiments, the vehicle behavior data can be encoded into the map database 104, the map database 410, and/or another database accessible by the apparatus 102. In one or more embodiments, the vehicle behavior data can be encoded in a database based on a format for the database. In certain embodiments, the apparatus 102, such as the processing circuitry 106, can be configured to convert the vehicle behavior data into a format for storage and/or categorization by the database. In one or more embodiments, the apparatus 102, such as the processing circuitry 106, can be configured to generate and/or update map data for a map layer associated with the road segment based on the vehicle behavior data. For example, in one or more embodiments, the apparatus 102, such as the processing circuitry 106, can be configured to generate and/or update vehicle behavior patterns associated with historical data for the road segment. In one or more embodiments, the apparatus 102, such as the processing circuitry 106, can be configured to combine real-time vehicle behavior data for the road segment with historical vehicle behavior data for the road segment.

In one or more embodiments, the apparatus 102, such as the processing circuitry 106, can be configured to map the vehicle behavior data onto a map data layer of a high-definition map to facilitate the modeling of the vehicle behavior associated with the road segment. For instance, in certain embodiments, the apparatus 102, such as the processing circuitry 106, can be configured to store the vehicle behavior data in a map data layer of a map (e.g., an HD map) for mapping purposes, navigation purposes, and/or autonomous driving purposes. In certain embodiments, the apparatus 102, such as the processing circuitry 106, can be configured to store the vehicle behavior data in two or more map data layer of a map (e.g., an HD map) for mapping purposes, navigation purposes, and/or autonomous driving purposes. For example, in an embodiment, vehicle behavior data for first vehicle data can be stored in a first map data layer, vehicle behavior data for second vehicle data can be stored in a second map data layer, etc. Additionally or alternatively, in an embodiment, vehicle behavior data for a first type of vehicle model can be stored in a first map data layer, vehicle behavior data for a second type of vehicle model can be stored in a second map data layer, etc. Additionally or alternatively, in an embodiment, vehicle behavior data for a first location can be stored in a first map data layer, vehicle behavior data for a second location can be stored in a second map data layer, etc. Additionally or alternatively, in an embodiment, vehicle behavior data for a first time or date can be stored in a first map data layer, vehicle behavior data for a second time or date can be stored in a second map data layer, etc. Additionally or alternatively, in an embodiment, vehicle behavior data for a first type of vehicle version can be stored in a first map data layer, vehicle behavior data for a second type of vehicle version can be stored in a second map data layer, etc. Additionally or alternatively, in an embodiment, vehicle behavior data for a first type of reason can be stored in a first map data layer, vehicle behavior data for a second type of reason can be stored in a second map data layer, etc. Additionally or alternatively, in an embodiment, vehicle behavior data for vehicles traveling in a first direction with respect to a road segment can be stored in a first map data layer, vehicle behavior data for vehicles traveling in a first direction with respect to a road segment can be stored in a second map data layer, etc. Additionally or alternatively, in an embodiment, vehicle behavior data for a first vehicle identifier (e.g., a first vehicle license plate number) can be stored in a first map data layer, vehicle behavior data for a second vehicle identifier (e.g., a second vehicle license plate number) can be stored in a second map data layer, etc. Additionally or alternatively, in an embodiment, vehicle behavior data for a first user identity (e.g., a first user account) to facilitate incentives can be stored in a first map data layer, vehicle behavior data for a second user identity (e.g., a second user account) to facilitate incentives can be stored in a second map data layer, etc. Additionally or alternatively, in an embodiment, vehicle behavior data for a first cryptocurrency account for a first user identity to facilitate providing one or more cryptocurrency tokens to the first cryptocurrency account can be stored in a first map data layer, vehicle behavior data for a second cryptocurrency account for a second user identity to facilitate providing one or more cryptocurrency tokens to the second cryptocurrency account can be stored in a second map data layer, etc. In certain embodiments, the apparatus 102, such as the processing circuitry 106, can be configured to link and/or associate the vehicle behavior data with one or more portions, components, areas, layers, features, text, symbols, and/or data records of a map (e.g., an HD map).

In one or more embodiments, the apparatus 102, such as the processing circuitry 106, can be configured to generate a data point for a map layer associated with the road segment based on the vehicle behavior data and the location data. The data point can indicate the vehicle behavior data and/or a location associated with the vehicle behavior data. Additionally or alternatively, in one or more embodiments, the apparatus 102, such as the processing circuitry 106, can be configured to store the data point in the database associated with the map layer. The map layer can include the data point and one or more other data points that indicate one or more other locations related to respective vehicle behavior data for one or more other vehicles associated with the road segment. In certain embodiments, the apparatus 102, such as the processing circuitry 106, can be configured to aggregate the data point with another data point of the map layer in response to a determination that a distance between the data point and the other data point satisfies a defined criterion.

In one or more embodiments, the apparatus 102, such as the processing circuitry 106, can be configured to generate one or more road links (e.g., one or more map-matched road links) for the road segment to facilitate vehicle behavior prediction for vehicles associated with the road segment. For instance, in one or more embodiments, the apparatus 102, such as the processing circuitry 106, can be configured to map a calculated value onto a road network map. In certain embodiments, the calculated value can correspond to a number between 0-1. For instance, in certain embodiments, the calculated value (e.g., the number between 0-1) can correspond to a percentage chance of likelihood to demonstrate a particular type of vehicle behavior. In an aspect, the apparatus 102, such as the processing circuitry 106, can be configured to map the calculated value based on a type of vehicle behavior.

In one or more embodiments, the apparatus 102, such as the processing circuitry 106, can be additionally or alternatively configured to facilitate routing of one or more vehicles associated with the road segment based on the vehicle behavior data. In one or more embodiments, the apparatus 102, such as the processing circuitry 106, can be additionally or alternatively configured to facilitate routing of one or more vehicles associated with the road segment based on user feedback provided in response to an indication to a user of a vehicle that the vehicle behavior data satisfies a defined criterion. In one or more embodiments, the apparatus 102, such as the processing circuitry 106, can be additionally or alternatively configured to cause rendering of data via a map display of one or more vehicles associated with the road segment and/or another road segment based on the vehicle behavior data associated with the road segment. For example, in one or more embodiments, the apparatus 102, such as the processing circuitry 106, can be additionally or alternatively configured to render a certain type of visual indicator (e.g., a red color, a green color, a yellow color, etc.) via a map display of one or more vehicles associated with the road segment and/or another road segment based on predicted vehicle behavior for the road segment. In an embodiment, the apparatus 102 further includes means, such as the processing circuitry 106, the memory 108, or the like, configured to facilitate autonomous driving of the vehicle based on the vehicle behavior data. For instance, in one or more embodiments, the vehicle behavior data encoded in the database can be employed by one or more other vehicles to facilitate autonomous driving for the one or more vehicles. In one or more embodiments, one or more notifications can be provided to a display of a vehicle based on the vehicle behavior data encoded in the database. For example, in response to a determination that a particular road segment is associated with a first type of vehicle behavior, then a notification can be generated to advise other vehicles.

In an embodiment, the apparatus 102 further includes means, such as the processing circuitry 106, the memory 108, or the like, configured to receive the vehicle sensor data from the vehicle. Additionally or alternatively, in an embodiment, the apparatus 102 further includes means, such as the processing circuitry 106, the memory 108, or the like, configured to generate incentive data for a user identity associated with the vehicle in response to the receiving the vehicle sensor data from the vehicle. In one or more embodiments, the apparatus 102, such as the processing circuitry 106, can be configured to provide one or more cryptocurrency tokens to an account associated with the user identity. In an embodiment, the apparatus 102 further includes means, such as the processing circuitry 106, the memory 108, or the like, configured to generate incentive data for one or more user identities associated with the one or more vehicles based on the vehicle sensor data.

In an embodiment, the apparatus 102 further includes means, such as the processing circuitry 106, the memory 108, or the like, configured to receive, via one or more sensors of a vehicle, vehicle sensor data associated with one or more vehicles traveling along a road segment proximate to the vehicle. In another embodiment, the apparatus 102 further includes means, such as the processing circuitry 106, the memory 108, or the like, configured to identify one or more features of the vehicle sensor data. Additionally, in another embodiment, the apparatus 102 further includes means, such as the processing circuitry 106, the memory 108, or the like, configured to train, based on the one or more features of the vehicle sensor data, a machine learning model associated with detection of vehicle behavior to facilitate mapping vehicle behavior data onto a map data layer. In one or more embodiments, the apparatus 102 further includes means, such as the processing circuitry 106, the memory 108, or the like, configured to train the machine learning model to facilitate autonomous driving of vehicles associated with the road segment. In one or more embodiments, the apparatus 102 further includes means, such as the processing circuitry 106, the memory 108, or the like, configured to train the machine learning model to facilitate surveillance of the road segment by a surveillance system. In one or more embodiments, the apparatus 102 further includes means, such as the processing circuitry 106, the memory 108, or the like, configured to train the machine learning model to facilitate surveillance of the road segment by a law enforcement system.

FIG. 5 illustrates an example embodiment of a system 500 specifically configured for implementing embodiments described herein. The system 500 can be, for example, a non-limiting network architecture configured for implementing embodiments described herein. As illustrated in FIG. 5, the system 500 includes the apparatus 102, the vehicle 300 and the vehicle 304. However, it is to be appreciated that, in certain embodiments, the system 500 can include one or more other vehicles. In an embodiment, the vehicle 300 includes one or more sensors 502. The one or more sensors 502 include one or more camera sensors, one or more IR camera sensors; one or more 3D camera data; one or more 360° camera sensors, one or more GPS sensors, one or more accelerometer sensors, one or more LiDAR sensors, one or more radar sensors, one or more gyroscope sensors, one or more ultrasonic sensors, one or more electromagnetic sensors, and/or one or more other sensors. In an embodiments, one or more sensors of the one or more sensors 502 correspond to one or more sensors of the one or more sensors 112. Any of the one or more sensors 502 may be used to sense information regarding a surrounding environment of the vehicle 300 and/or a road segment (e.g., the road segment 302) associated with the vehicle 300. For example, any one of the one or more sensors 502 may be used to sense information regarding the vehicle 304 proximate to the vehicle 300 and/or one or more other vehicles proximate to the vehicle 300. In one or more embodiments, one or more portions of the vehicle sensor data can be captured by one or more sensors of the one or more sensors 502.

Additionally or alternatively, any one of the one or more sensors 502 may be used to sense information regarding movement of the vehicle 300, the vehicle 304, and/or one or more other vehicles proximate to the vehicle 300. Additionally or alternatively, any one of the one or more sensors 502 may be used to sense information regarding positioning of the vehicle 300, the vehicle 304, and/or one or more other vehicles proximate to the vehicle 300. Additionally or alternatively, any one of the one or more sensors 502 may be used to sense information regarding orientation of the vehicle 300, the vehicle 304, and/or one or more other vehicles proximate to the vehicle 300. Additionally or alternatively, any one of the one or more sensors 502 may be used to sense information regarding a status of the vehicle 300, the vehicle 304, and/or one or more other vehicles proximate to the vehicle 300. Additionally or alternatively, any one of the one or more sensors 502 may be used to determine autonomous driving data associated with the vehicle 300, the vehicle 304, and/or one or more other vehicles proximate to the vehicle 300.

In one or more embodiments, the apparatus 102, such as the processing circuitry 106, can be configured to receive the vehicle sensor data provided by the one or more sensors 502. In one or more embodiments, the apparatus 102, such as the processing circuitry 106, can be configured to employ the vehicle sensor data provided by the one or more sensors 502 for use in surveillance of vehicles and/or a road environments associated with vehicles, vehicle behavior prediction, navigation assistance and/or autonomous vehicle control, as further described herein according to example embodiments. In one or more embodiments, the apparatus 102, such as the processing circuitry 106, can be configured to determine one or more features for the vehicle sensor data provided by the one or more sensors 502, as further described herein according to example embodiments. In an embodiment, the vehicle sensor data associated with the one or more sensors 502 can be provided to the apparatus 102 via the network 412. For instance, in an embodiment, the apparatus 102 can be communicatively coupled to the vehicle 300 via the network 412. In an alternate embodiment, the vehicle 300 can include the apparatus 102. In certain embodiments, the vehicle 304 can additionally include one or more sensors such as one or more camera sensors, one or more IR camera sensors; one or more 3D camera data; one or more 360° camera sensors, one or more GPS sensors, one or more accelerometer sensors, one or more LiDAR sensors, one or more radar sensors, one or more gyroscope sensors, one or more ultrasonic sensors, one or more electromagnetic sensors, and/or one or more other sensors to facilitate surveillance of vehicles and/or a road environments associated with vehicles, vehicle behavior prediction, navigation assistance and/or autonomous vehicle control, as further described herein according to example embodiments.

FIG. 6 illustrates an example embodiment of a system 500' specifically configured for implementing embodiments described herein. The system 500' can be, for example, an alternate embodiment of the system 500. As illustrated in FIG. 6, the system 500' includes the apparatus 102, the vehicle 300, the vehicle 304 and a surveillance system 602. However, it is to be appreciated that, in certain embodiments, the system 500' can include one or more other vehicles. In an embodiment, the vehicle 300 includes the one or more sensors 502. In an embodiment, the surveillance system 602 can be a system that employs the vehicle behavior data generated by the apparatus 102 to facilitate surveillance of vehicles and/or a road environment associated with vehicles.

In an embodiment, the apparatus 102 and/or a map database (e.g., the map database 104, the map database 410 and/or another map database) associated with the apparatus 102 can be communicatively coupled to the surveillance system 602 via the network 412. In an alternate embodiment, the surveillance system 602 can include the apparatus 102 and/or a map database (e.g., the map database 104, the map database 410 and/or another map database) associated with the apparatus 102. In one or more embodiments, the surveillance system 602 can be configured to access one or more map data layers of a map database (e.g., the map database 104, the map database 410 and/or another map database) associated with the apparatus 102. For example, in one or more embodiments, the surveillance system 602 can be configured to access vehicle behavior data stored in one or more map data layers of a map database (e.g., the map database 104, the map database 410 and/or another map database) associated with the apparatus 102. In one or more embodiments, the surveillance system 602 can be configured to access vehicle behavior data stored in the one or more map data layers based on type of vehicle model, location, road segment, time, type of vehicle version, type of reason, direction of travel of vehicles with respect to a road segment, vehicle identifier (e.g., vehicle license plate number), and/or other information. In one or more embodiments, the surveillance system 602 can be configured to execute one or more actions based on the vehicle behavior data stored in one or more map data layers of a map database (e.g., the map database 104, the map database 410 and/or another map database) associated with the apparatus 102. In one or more embodiments, the surveillance system 602 can be configured to execute one or more actions based on one or more rules (e.g., one or more traffic laws) with respect to the vehicle behavior data stored in one or more map data layers of a map database (e.g., the map database 104, the map database 410 and/or another map database) associated with the apparatus 102. In one or more embodiments, the surveillance system 602 can be configured to generate one or more notifications for a display (e.g., a user interface of a user device, a display of a vehicle, etc.) based on the vehicle behavior data stored in one or more map data layers of a map database (e.g., the map database 104, the map database 410 and/or another map database) associated with the apparatus 102. In one or more embodiments, the surveillance system 602 can be configured to classify one or more events related to vehicles and/or a road segment associated with vehicles based on the vehicle behavior data stored in one or more map data layers of a map database (e.g., the map database 104, the map database 410 and/or another map database) associated with the apparatus 102. In one or more embodiments, the surveillance system 602 can be configured to update a database (e.g., a law enforcement database) based on the vehicle behavior data stored in one or more map data layers of a map database (e.g., the map database 104, the map database 410 and/or another map database) associated with the apparatus 102.

FIG. 7 illustrates an example embodiment of a system 500" specifically configured for implementing embodiments described herein. The system 500" can be, for example, an alternate embodiment of the system 500. As illustrated in FIG. 7, the system 500" includes the apparatus 102, the vehicle 300, the vehicle 304 and an incentive system 702. However, it is to be appreciated that, in certain embodiments, the system 500" can include one or more other vehicles. In an embodiment, the vehicle 300 includes the one or more sensors 502. Furthermore, in certain embodiments, the system 500" can additionally include the surveillance system 602. In an embodiment, the incentive system 702 can be a system that employs the vehicle behavior data generated by the apparatus 102 to facilitate providing one or more incentives to one or more users associated with one or more vehicles.

In an embodiment, the apparatus 102 and/or a map database (e.g., the map database 104, the map database 410 and/or another map database) associated with the apparatus 102 can be communicatively coupled to the incentive system 702 via the network 412. In an alternate embodiment, the incentive system 702 can include the apparatus 102 and/or a map database (e.g., the map database 104, the map database 410 and/or another map database) associated with the apparatus 102. In one or more embodiments, the incentive system 702 can be configured to access one or more map data layers of a map database (e.g., the map database 104, the map database 410 and/or another map database) associated with the apparatus 102. For example, in one or more embodiments, the incentive system 702 can be configured to access vehicle behavior data stored in one or more map data layers of a map database (e.g., the map database 104, the map database 410 and/or another map database) associated with the apparatus 102. In one or more embodiments, the incentive system 702 can be configured to access vehicle behavior data stored in the one or more map data layers based on user identity, user account, incentive account, cryptocurrency account, and/or other information.

In one or more embodiments, the incentive system 702 can be configured to execute one or more actions based on the vehicle behavior data stored in one or more map data layers of a map database (e.g., the map database 104, the map database 410 and/or another map database) associated with the apparatus 102. In one or more embodiments, the incentive system 702 can be configured to execute one or more actions based on one or more rules (e.g., one or more traffic laws) with respect to the vehicle behavior data stored in one or more map data layers of a map database (e.g., the map database 104, the map database 410 and/or another map database) associated with the apparatus 102. In one or more embodiments, the incentive system 702 can be configured to generate one or more notifications for a display (e.g., a user interface of a user device, a display of a vehicle, etc.) based on the vehicle behavior data stored in one or more map data layers of a map database (e.g., the map database 104, the map database 410 and/or another map database) associated with the apparatus 102. In one or more embodiments, the incentive system 702 can be configured to classify one or more incentive events related to vehicles and/or a road segment associated with vehicles based on the vehicle behavior data stored in one or more map data layers of a map database (e.g., the map database 104, the map database 410 and/or another map database) associated with the apparatus 102. In one or more embodiments, the incentive system 702 can be configured to update a database (e.g., an incentive database) based on the vehicle behavior data stored in one or more map data layers of a map database (e.g., the map database 104, the map database 410 and/or another map database) associated with the apparatus 102. In one or more embodiments, the incentive system 702 can be configured to generate incentive data for a user identity based on the vehicle behavior data stored in one or more map data layers of a map database (e.g., the map database 104, the map database 410 and/or another map database) associated with the apparatus 102. In one or more embodiments, the incentive system 702 can be configured to provide one or more cryptocurrency tokens to an account associated with the user identity based on the vehicle behavior data stored in one or more map data layers of a map database (e.g., the map database 104, the map database 410 and/or another map database) associated with the apparatus 102. In one or more embodiments, the incentive system 702 can be configured to provide one or more cryptocurrency tokens to an account associated with a vehicle that provides vehicle sensor data to the apparatus 102. In one or more embodiments, the incentive system 702 can be configured to provide the one or more cryptocurrency tokens via blockchain cryptocurrency technology.

FIG. 8 illustrates an example embodiment of an architecture specifically configured for implementing embodiments described herein. The illustrated embodiment of FIG. 8 may be vehicle-based, where vehicle behavior data 802 is generated based on vehicle sensor data provided by one or more vehicles (e.g., the vehicle 300) traveling along a road segment. Additionally or alternatively, in one or more embodiments, the vehicle behavior data 802 can be generated by a machine learning model 804 trained for detection of vehicle behavior (e.g., based on historical vehicle sensor data and one or more rules associated with the road segment). In certain embodiments, location data associated with one or vehicles can be obtained from the one or more vehicles using GPS or other localization techniques to facilitate detection of vehicle behavior based on the machine learning model 804. According to one or more embodiments, the vehicle behavior data 802 can be correlated to map data of the map data service provider 808. In certain embodiments, surveillance of vehicles and/or a road environment associated with vehicles can be improved by employing the vehicle behavior data 802, the machine learning model 804 and/or vehicle sensor data employed to generate the vehicle behavior data 802. In certain embodiments, vehicle with autonomous or semi-autonomous control may establish improved prediction of vehicle behavior, accurate location and/or improved autonomous driving functionality through the vehicle behavior data 802, the machine learning model 804 and/or vehicle sensor data employed to generate the vehicle behavior data 802 to facilitate the autonomous or semi-autonomous control.

As illustrated in FIG. 8, the architecture includes the map data service provider 808 that provides map data 825 (e.g., HD maps and policies associated with road links within the map) to an Advanced Driver Assistance System (ADAS) 805, which may be vehicle-based or server based depending upon the application. The map data service provider 808 may be a cloud-based 810 service. In one or more embodiments, the ADAS 805 receives the vehicle behavior 802 and may provide the vehicle behavior 802 to map matcher 815. The map matcher 815 may correlate the vehicle behavior 802 to a road link on a map of the mapped network of roads stored in the map cache 820. This link or segment, along with the direction of travel, may be used to establish vehicle behavior data associated with vehicles and/or which HD map policies are applicable to the vehicle associated with the ADAS 805, including sensor capability information, autonomous functionality information, etc. Accordingly, in one or more embodiments, policies, vehicle behavior, and/or incentives for one or more vehicles are established based on the vehicle behavior 802. The map data 825 associated with the road segment specific to the vehicle are provided to the vehicle control, such as via the CAN (computer area network) BUS (or Ethernet or Flexray) 840 to the electronic control unit (ECU) 845 of the vehicle to implement HD map policies, such as various forms of autonomous or assisted driving, or navigation assistance. In certain embodiments, a data access layer 835 can manage and/or facilitate access to the map cache 820, the map data 825, and/or an ADAS map database 830. In an embodiment, at least a portion of the ADAS map database 830 can correspond to the map database 104 and/or the map database 410.

In one or more embodiments, by employing surveillance of road environments via deep learning in accordance with one or more example embodiments of the present disclosure, precision and/or confidence of vehicle behavior and/or autonomous driving for a vehicle can be improved. Furthermore, by employing surveillance of road environments via deep learning in accordance with one or more example embodiments of the present disclosure, improved navigation of a vehicle can be provided, improved route guidance for a vehicle can be provided, improved semi-autonomous vehicle control can be provided, improved fully autonomous vehicle control can be provided, and/or improved safety of a vehicle can be provided. Moreover, in accordance with one or more example embodiments of the present disclosure, efficiency of an apparatus including the processing circuitry can be improved and/or the number of computing resources employed by processing circuitry can be reduced. In one or more embodiments, by employing surveillance of road environments via deep learning in accordance with one or more example embodiments of the present disclosure, improved statistical information for a road segment can be provided to provide improved surveillance for the road segment.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Furthermore, in some embodiments, additional optional operations can be included. Modifications, additions, or amplifications to the operations above can be performed in any order and in any combination.

Moreover, although the foregoing descriptions and the associated drawings describe example embodiments in the context of certain example combinations of elements and/or functions, it should be appreciated that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

That which is claimed:

1. A computer-implemented method for surveillance of road environments via deep learning, the computer-implemented method comprising:
   determining one or more features for vehicle sensor data associated with one or more vehicles traveling along a road segment proximate to a vehicle, wherein the vehicle comprises one or more sensors that captures the vehicle sensor data;
   predicting, using a machine learning model that receives the one or more features, vehicle behavior data associated with the one or more vehicles, wherein the machine learning model is trained for detection of vehicle behavior based on historical vehicle sensor data and one or more rules associated with the road segment;
   generating incentive data indicative of a first incentive or a second incentive based on the vehicle behavior data;
   encoding the vehicle behavior data onto a first map data layer associated with a database;
   encoding the incentive data onto a second map data layer associated with the database to enable provision of the first incentive or the second incentive to an account for a user identity associated with the vehicle; and
   causing at least one of routing of the vehicle via an electronic control unit of the vehicle or rendering of data via a map display based on the vehicle behavior data, the incentive data, or a combination of the vehicle behavior data and the incentive data.

2. The computer-implemented method of claim 1, further comprising:
   receiving the vehicle sensor data from the vehicle; and
   in response to receiving the vehicle sensor data from the vehicle, generating the incentive data.

3. The computer-implemented method of claim 1, wherein the encoding the incentive data onto the second map data layer enables provision of one or more cryptocurrency tokens to the account associated with the user identity.

4. The computer-implemented method of claim 1, wherein the first map data layer is a map data layer of a high-definition map to facilitate modeling of the vehicle behavior associated with the road segment.

5. The computer-implemented method of claim 1, wherein the encoding the vehicle behavior data onto the first map data layer comprises encoding the vehicle behavior data onto the first map data layer based on location data associated with the road segment.

6. The computer-implemented method of claim 1, wherein the encoding the vehicle behavior data onto the first map data layer comprises encoding the vehicle behavior data onto the first map data layer based on vehicle data associated with the one or more vehicles.

7. The computer-implemented method of claim 1, wherein the encoding the vehicle behavior data onto the first map data layer comprises encoding the vehicle behavior data onto the first map data layer based on time data associated with capture of the vehicle sensor data by the one or more sensors of the vehicle.

8. The computer-implemented method of claim 1, further comprising:
   facilitating autonomous driving of the vehicle based on the vehicle behavior data.

9. The computer-implemented method of claim 1, wherein the determining the one or more features for the vehicle sensor data comprises determining the one or more features for the vehicle sensor data in response to a determination that the vehicle is associated with a defined geofence region of the road segment.

10. An apparatus configured to provide for surveillance of road environments via deep learning, the apparatus comprising processing circuitry and at least one memory including computer program code instructions, the computer program code instructions configured to, when executed by the processing circuity, cause the apparatus to:
    determine one or more features for vehicle sensor data associated with one or more vehicles traveling along a road segment proximate to a vehicle, wherein the vehicle comprises one or more sensors that captures the vehicle sensor data;
    predict, using a machine learning model that receives the one or more features, vehicle behavior data associated with the one or more vehicles, wherein the machine learning model is trained for detection of vehicle behavior based on historical vehicle sensor data and one or more rules associated with the road segment;
    generate incentive data indicative of a first incentive or a second incentive based on the vehicle behavior data;
    encode the vehicle behavior data onto a first map data layer associated with a database;
    encode the incentive data onto a second map data layer associated with the database to enable provision of the first incentive or the second incentive to an account for a user identity associated with the vehicle; and
    cause at least one of routing of the vehicle via an electronic control unit of the vehicle or rendering of data via a map display based on the vehicle behavior data, the incentive data, or a combination of the vehicle behavior data and the incentive data.

11. The apparatus of claim 10, wherein the computer program code instructions are further configured to, when executed by the processing circuitry, cause the apparatus to generate the incentive data in response to the vehicle sensor data being received from the vehicle.

12. The apparatus of claim 10, wherein the computer program code instructions are further configured to, when executed by the processing circuitry, cause the apparatus to provide one or more cryptocurrency tokens to the account associated with the user identity.

13. The apparatus of claim 10, wherein the first map data layer is a map data layer of a high-definition map to facilitate modeling of the vehicle behavior associated with the road segment.

14. The apparatus of claim 13, wherein the computer program code instructions are further configured to, when executed by the processing circuitry, cause the apparatus to encode the vehicle behavior data onto the first map data layer based on vehicle data associated with the one or more vehicles.

15. The apparatus of claim 13, wherein the computer program code instructions are further configured to, when executed by the processing circuitry, cause the apparatus to encode the vehicle behavior data onto the first map data layer based on time data associated with capture of the vehicle sensor data by the one or more sensors of the vehicle.

16. The apparatus of claim 10, wherein the computer program code instructions are further configured to, when executed by the processing circuitry, cause the apparatus to facilitate autonomous driving of the vehicle based on the vehicle behavior data.

17. A computer-implemented method for surveillance of road environments via deep learning, the computer-implemented method comprising:
- receiving, via one or more sensors of a first vehicle, vehicle sensor data associated with one or more vehicles traveling along a road segment proximate to the first vehicle;
- identifying one or more features of the vehicle sensor data;
- training, based on the one or more features of the vehicle sensor data, a machine learning model associated with detection of vehicle behavior to enable (i) mapping vehicle behavior data onto a first map data layer and (ii) mapping incentive data associated with the vehicle behavior data onto a second map data layer to enable provision of an incentive to an account for a user identity associated with a second vehicle; and
- causing at least one of routing of the second vehicle via an electronic control unit of the second vehicle or rendering of data via a map display based on the trained machine learning model.

18. The computer-implemented method of claim 17, wherein the training comprises training the machine learning model to facilitate autonomous driving of vehicles associated with the road segment.

19. The computer-implemented method of claim 17, wherein the training comprises training the machine learning model to facilitate surveillance of the road segment by a law enforcement system.

* * * * *